(12) United States Patent
Dunlop et al.

(10) Patent No.: US 9,836,993 B2
(45) Date of Patent: Dec. 5, 2017

(54) REALISTIC TRAINING SCENARIO SIMULATIONS AND SIMULATION TECHNIQUES

(71) Applicant: Lawrence Livermore National Security, LLC, Livermore, CA (US)

(72) Inventors: William H. Dunlop, Livermore, CA (US); Tawny R. Koncher, Brentwood, CA (US); Stanley John Luke, Dublin, CA (US); Jerry Joseph Sweeney, Livermore, CA (US); Gregory K. White, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 294 days.

(21) Appl. No.: 14/109,846

(22) Filed: Dec. 17, 2013

(65) Prior Publication Data

US 2014/0167953 A1 Jun. 19, 2014

Related U.S. Application Data (60) Provisional application No. 61/738,364, filed on Dec. 17, 2012.

(51) Int. Cl.
*G08B 29/00* (2006.01)
*G09B 19/00* (2006.01)

(52) U.S. Cl.
CPC .................................. *G09B 19/00* (2013.01)

(58) Field of Classification Search
CPC .................................................. G09B 19/00
See application file for complete search history.

(56) References Cited

U.S. PATENT DOCUMENTS

| | | | |
|---|---|---|---|
| 3,293,777 A | 12/1966 | Shaw | |
| 4,752,226 A * | 6/1988 | Akers | G09B 9/00 434/11 |
| 5,304,065 A | 4/1994 | Hurst et al. | |
| 5,694,129 A * | 12/1997 | Fujinawa | G01V 1/008 324/348 |
| 5,767,777 A | 6/1998 | Whitehead | |
| 5,807,113 A * | 9/1998 | Groeber | G09B 9/00 434/218 |
| 5,815,417 A | 9/1998 | Orr et al. | |
| 5,977,872 A | 11/1999 | Guertin | |

(Continued)

OTHER PUBLICATIONS

Wikipedia—Seismometer—Feb. 13, 2010.*

(Continued)

*Primary Examiner* — Quang D Pham
(74) *Attorney, Agent, or Firm* — Zilka-Kotab PC (57) ABSTRACT

In one embodiment, a system includes a signal generator operatively coupleable to one or more detectors; and a controller, the controller being both operably coupled to the signal generator and configured to cause the signal generator to: generate one or more signals each signal being representative of at least one emergency event; and communicate one or more of the generated signal(s) to a detector to which the signal generator is operably coupled. In another embodiment, a method includes: receiving data corresponding to one or more emergency events; generating at least one signal based on the data; and communicating the generated signal(s) to a detector.

19 Claims, 4 Drawing Sheets

(56) References Cited

U.S. PATENT DOCUMENTS

| | | | |
|---|---|---|---|
| 7,044,742 B2 | 5/2006 | Sumiya et al. | |
| 7,375,646 B1* | 5/2008 | Diaz-Lopez | G01V 1/008 |
| | | | 340/521 |
| 7,552,017 B1* | 6/2009 | Baker | G01T 1/171 |
| | | | 250/252.1 |
| 7,965,178 B1 | 6/2011 | Schmuttor et al. | |
| 8,310,358 B2* | 11/2012 | Watanabe | G06F 21/32 |
| | | | 340/5.8 |
| 8,696,364 B2* | 4/2014 | Cohen | G09B 7/00 |
| | | | 434/322 |
| 8,827,714 B2 | 9/2014 | Goforth et al. | |
| 2003/0125998 A1 | 7/2003 | McKenney et al. | |
| 2003/0156706 A1* | 8/2003 | Koehler | G09B 5/00 |
| | | | 379/265.05 |
| 2004/0166484 A1* | 8/2004 | Budke | G09B 19/00 |
| | | | 434/433 |
| 2005/0001720 A1* | 1/2005 | Mason | G01C 21/206 |
| | | | 340/539.13 |
| 2005/0004789 A1* | 1/2005 | Summers | G06Q 10/10 |
| | | | 703/22 |
| 2005/0170326 A1* | 8/2005 | Koehler | G09B 5/00 |
| | | | 434/350 |
| 2006/0003299 A1* | 1/2006 | Patire | G09B 19/00 |
| | | | 434/247 |
| 2006/0042177 A1* | 3/2006 | Lin | G01V 1/008 |
| | | | 52/167.1 |
| 2006/0073447 A1* | 4/2006 | Bjork | F41A 33/00 |
| | | | 434/218 |
| 2007/0027668 A1* | 2/2007 | Chen | G06F 11/263 |
| | | | 703/13 |
| 2007/0044539 A1* | 3/2007 | Sabol | G06Q 10/06 |
| | | | 73/19.01 |
| 2007/0225917 A1* | 9/2007 | Guatteri | G01V 1/008 |
| | | | 702/15 |
| 2008/0021659 A1* | 1/2008 | Bertogg | G01V 1/008 |
| | | | 702/15 |
| 2008/0062167 A1* | 3/2008 | Boggs | G06T 19/00 |
| | | | 345/419 |
| 2008/0241805 A1 | 10/2008 | Schantz | |
| 2008/0294725 A1 | 11/2008 | Kim et al. | |
| 2009/0035736 A1* | 2/2009 | Wolpert | G09B 19/00 |
| | | | 434/219 |
| 2009/0263770 A1 | 10/2009 | Ambrose | |
| 2009/0263771 A1* | 10/2009 | Darois | G09B 9/00 |
| | | | 434/218 |
| 2009/0271160 A1* | 10/2009 | Copenhagen | G09B 9/00 |
| | | | 703/6 |
| 2009/0281850 A1* | 11/2009 | Bruce | G01C 21/3438 |
| | | | 705/80 |
| 2010/0323334 A1 | 12/2010 | Goforth et al. | |
| 2012/0002976 A1* | 1/2012 | Gerber | H04B 10/1143 |
| | | | 398/140 |
| 2012/0092162 A1* | 4/2012 | Rosenberg | G08B 21/245 |
| | | | 340/541 |
| 2014/0199661 A1* | 7/2014 | Quail | F41J 5/02 |
| | | | 434/21 |

OTHER PUBLICATIONS

Notice of Allowance and Fee(s) Due from U.S. Appl. No. 12/488,806 dated Apr. 9, 2014.

Non-Final Office Action from U.S. Appl. No. 12/488,806 dated Nov. 25, 2011.

Final Office Action from U.S. Appl. No. 12/488,806 dated Apr. 24, 2012.

Non-Final Office Action from U.S. Appl. No. 12/488,806 dated Jan. 3, 2013.

Non-Final Office Action from U.S. Appl. No. 12/488,806 dated Aug. 14, 2013.

Persson et al., "Using a Sensor Source Intelligence Cell to Connect and Distribute Visual Information from a Commercial Game Engine in a Disaster Management Exercise," 2007 IEEE, Instrumentation and Measurement Technology Conference—IMTC 2007, May 1-3, 2007, pp. 1-5.

Wagner et al., "Radiological Disaster Simulators for Field and Aerial Measurements," 2002, pp. 1-10.

Webster et al., "Software as a Service Approach to Sensor Simulation Software Deployment," 2012 SPIE, Proceedings of SPIE, vol. 8403, pp. 84030I-1/84030I-9.

Erickson, D. et al., "Integrated battlefield-effects research for the National Training Center. Appendix H. Designs of nuclear and chemical field simulators for the National Training Center," Technical report, Jun. 13, 1983-Dec. 30, 1984, pp. 1-82.

Schmidtborn, I., "Emergency drills with or without a simulator?" Atw-Internationale Zeitschrift Fur Kernenergie 43 (6), 1998, pp. 389-390 (untranslated).

Goforth et al., U.S. Appl. No. 12/488,806, filed Jun. 22, 2009.

* cited by examiner

REALISTIC TRAINING SCENARIO SIMULATIONS AND SIMULATION TECHNIQUES

PRIORITY

The present application claims priority to U.S. Provisional Patent Application No. 61/738,364, titled "System for Simulation of Field Exercises" filed Dec. 17, 2012, which is herein incorporated by reference.

RELATED APPLICATIONS

The present application is related to U.S. Pat. No. 7,522,017 granted Jun. 23, 2009 to Baker, et. al and entitled "Tailpulse Signal Generator," which is herein incorporated by reference.

The present application is still further related to U.S. patent application Ser. No. 12/488,806 filed Jun. 22, 2009, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present application relates to the broad category of training where instrumentations is required such as emergency event response, and more particularly, where this invention relates to systems and techniques for simulating emergency and other training scenarios and relevant phenomena observable in connection therewith.

BACKGROUND

Emergency response training is a critical task in modern security and law-enforcement applications where any moment of duty may include experiencing and dealing with the consequences of an emergency event such as a natural disaster, industrial accident, military activity, security related activity, etc. A responder's ability to effectively respond to a given scenario is determined in no small part based on the responder's previous experience with observing and/or engaging similar scenarios. Accordingly, it is of great benefit for a given responder to be trained using experiences and observations that mimic, as closely and realistically as possible, the experience to which the responder would be exposed while responding to an actual emergency event.

For some types of emergency event, it is very difficult to accurately simulate conditions that would be experienced during an actual emergency event due to many factors, not least of which includes safety of the training personnel and/or environmental safety. For example, it would obviously be disadvantageous to release harmful or deadly materials into a training environment generally, and particularly disadvantageous to expose trainees to harmful materials in the course of training.

In the case of many biological and radioactive materials, the situation is even more severe because access to the material(s) of interest is either severely limited or forbidden altogether, foreclosing any possibility of conducting training exercises using the restricted materials. The effectiveness of training would likely be severely undermined using surrogates for the actual materials that would necessarily be introduced into the training scenario thus detracting from the training objectives by introducing artificialities.

Moreover, many conventional emergency response techniques and systems utilize surrogate sources in connection with an emergency event. The presence of surrogate sources reduces overall fidelity of exercises and therefore the effectiveness of the training. The simulated emergency response is accordingly less representative of actual emergency events and responses, reducing the overall value of the simulation.

Accordingly, it would be beneficial to provide training capabilities based on actual instrumentation systems, techniques, and associated computer generated information designed to conduct, facilitate, and/or enable realistic simulation of emergency event scenarios that are free from the usual constraints imposed by regulations restricting the possession and use of dangerous materials involved with an actual emergency event to be simulated. It would also be beneficial to increase the capacity to conduct such training currently limited by above mentioned costs and safety/security measures.

It would be further beneficial to provide a platform for conducting and/or modifying the simulations in real-time or near real-time to accurately represent one or more unique experiences of individual(s) taking part in the simulated exercise. It would be especially useful for the unique experiences of the individuals participating in the simulated exercise to substantially represent conditions that would be experienced during an actual emergency event of similar or identical nature and/or characteristics.

SUMMARY

In one embodiment, a system includes a signal generator operatively coupleable to one or more detectors; and a controller, the controller being both operably coupled to the signal generator and configured to cause the signal generator to: generate one or more signals each signal being representative of at least one emergency event; and communicate one or more of the generated signal(s) to a detector to which the signal generator is operably coupled.

In another embodiment, a method includes: receiving data corresponding to one or more emergency events; generating at least one signal based on the data; and communicating the generated signal(s) to a detector.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and techniques for simulating field response exercises, and/or related systems and methods.

In one general embodiment, a system includes a signal generator operatively coupleable to one or more detectors; and a controller, the controller being both operably coupled to the signal generator and configured to cause the signal generator to: generate one or more signals each signal being representative of at least one emergency event; and communicate one or more of the generated signal(s) to a detector to which the signal generator is operably coupled.

In another general embodiment, a method includes: receiving data corresponding to one or more emergency events; generating at least one signal based on the data; and communicating the generated signal(s) to a detector.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

It is intended that the presently disclosed inventive concepts be applicable to operating in various environments such as within structures, vessels, underground, etc. or to have the capability to be incorporated into larger "networks" to enable the broader emergency response command and control structure functions. For example the presently disclosed techniques could be employed to independently monitor the position, data and personnel exposure of responders, in some approaches.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 1:
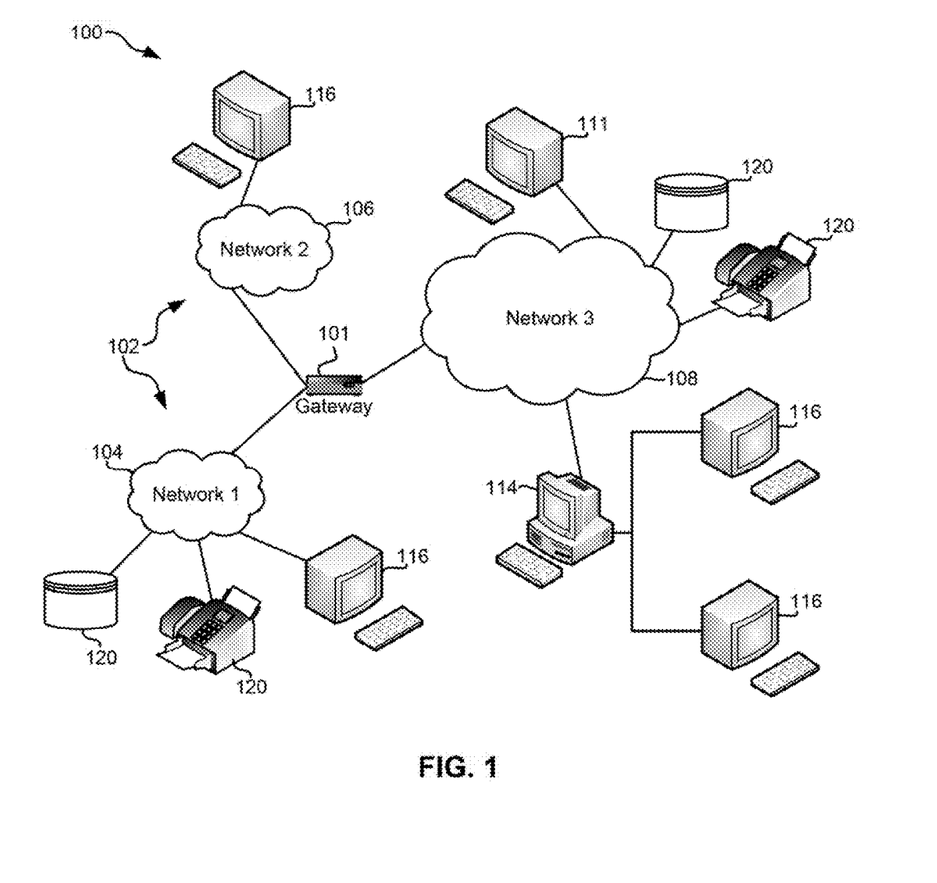
FIG. 1 is a simplified schematic drawing of an architecture, according to one embodiment.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

For example, in one embodiment the actual implementation of the electronic hardware and the instrument used by the responder could be retained to enable certain functions during a real emergency while certain functions would necessarily be removed to ensure that 'training' functions are expressly prohibited.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
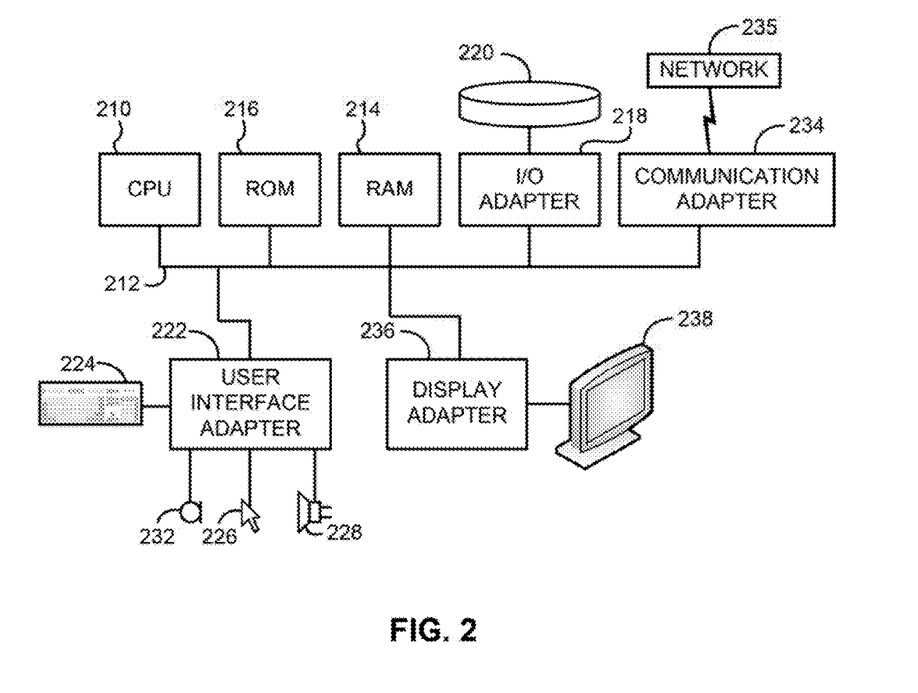
FIG. 2 is a simplified depiction of a representative simulation hardware environment, according to one instance.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Simulator System

Figure 3A:
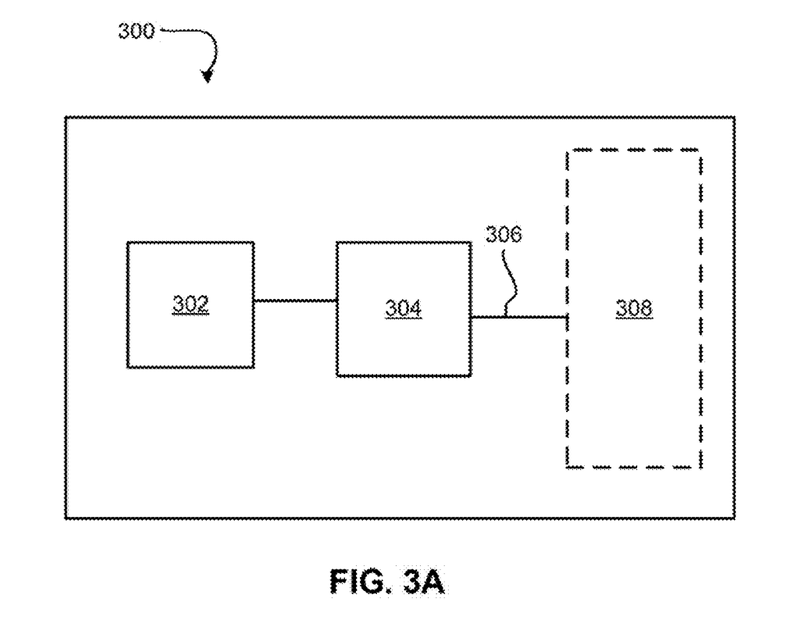
FIG. 3A shows a simplified schematic of a simulator system, according to one embodiment.

An exemplary simulator system 300 is shown schematically in FIG. 3A, according to one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

As understood herein, the term "legacy" data is used in reference to data and/or observations collected in connection with an actual event. The "legacy" data are utilized to mimic conditions that would be observed during a corresponding emergency under particular environmental conditions (e.g. time of day, prevailing winds, geographic location, etc.). Legacy data may additionally and/or alternatively utilized to validate simulation parameters, procedures, responses, results, etc. that are generated by one or more computer programs, e.g. to ensure consistency between the simulations and real-world conditions and/or response scenarios.

For example, in the case of simulating radiological events, legacy data may include any data collected in connection with an actual nuclear detonation, e.g. dispersion rate, spectral profile of radionuclides, seismic data, etc. as would be understood by one having ordinary skill in the art upon reading the present descriptions. The presently disclosed systems and techniques confer uniquely novel advantage to the simulation trainees because the simulation data collected and/or acted upon by trainees in the course of a simulation exercise are substantially identical to the same data that would be observed if the trainee were responding to an actual event under similar environmental conditions. For example the emergency simulation data correspond to actual emergency event data within approximately 95% similarity, 98% similarity, or 99% similarity, in various approaches.

For example, and for purposes of enablement only, the presently disclosed inventive concepts may leverage one or more of the data-based simulation systems, techniques, and/or functionalities, and particularly the legacy data-based simulation systems, techniques, and/or functionalities as disclosed in U.S. Pat. No. 7,552,017 to Baker, et. al, entitled "Tailpulse Signal Generator," which is herein incorporated by reference.

In some approaches, and depending on the needs of the responders, the fidelity of the training scenario can be tailored to specific needs. For example, in one approach three-dimensional issues such as radiation shielding effects afforded by certain materials in certain directions, resolution of spectra (e.g. as attributable to the type of instrument and its operational characteristics), etc. as would be understood by one having ordinary skill in the art upon reading the present descriptions.

The exemplary simulator system includes multiple components designed specifically to facilitate the simulation of emergency events, such as via enabling collection and/or transmission of data in connection with simulations, generating signals in association with a simulation, analyzing collected data in connection with a simulation, etc. as would be understood by one having ordinary skill in the art upon reading the present descriptions. Of course, the exemplary simulator system described herein may optionally include additional or fewer components and/or functionalities according to what would a skilled artisan would appreciate to be advantageous in the various applications of the presently described systems.

In one embodiment, and as shown particularly in FIG. 3A, the simulator system 300 includes a signal generator 302 and a controller 304 operatively coupled to the signal generator. The controller 304 is configured to cause the signal generator(s) to which it is coupled to generate a signal or signals 306. The signal(s) 306 are representative of at least one emergency event being simulated.

The signal generator 302, in some embodiments, may include any known type of signal generator capable of generating an observable signal relating to an emergency event, e.g., using known signal generation techniques. Moreover, the signal generator may include multiple signal generators. In a preferred embodiment, the signal generator(s) 302 each comprise at least one of: a field-programmable gate array (FPGA), an application-specific integrated circuit (ASIC), and digital-to-analog converted (DAC). The FPGA, ASIC, DAC, or other equivalent thereof in the signal generator 302 is preferably configured to generate one and/or a plurality of synthetic signals 306 representative of emergency event simulations (e.g. synthetic signals representing a seismic event, radiological event, chemical event, biological event, etc.).

Even more preferably, the signal generator 302 is configured to generate the synthetic signal(s) 306 based at least in part on sampling one or more probability distributions. The synthetic signal(s) 306 may also be generated based in whole or in part on other data, such as location data (e.g. global positioning system (GPS) coordinates, address, proximity information, etc.), temporal data (e.g. time elapsed since a predetermined event such as environmental exposure to a material, a time of day, a time remaining in the simulation schedule, etc.), trainee identity and/or role (e.g. whether the trainee is a responder, inspector, commander, etc.), environmental conditions (e.g. weather, proximity to point of interest, etc.) or any other type of data useful to conducting a simulation exercise that would be appreciated by one having ordinary skill in the art upon reading the present descriptions.

In turn, the probability distributions may be based in part or in whole on analyzing data collected in connection with an actual emergency event of a similar nature, e.g. a nuclear weapon test, a chemical or biological weapons test, a controlled material (e.g. radioactive material for medical treatment) transport operation, etc. as would be understood by one having ordinary skill in the art upon reading the present descriptions.

In some approaches, data points such as time, location, environmental conditions, measurement conditions, etc. may be leveraged as trigger parameters configured to direct the evolution of a simulation exercise, e.g. by introducing new variables into a simulation environment, dynamically responding to action(s) taken by one or more simulation trainees, etc. Preferably, the trigger parameters may influence the evolution of the simulation exercise by instructing or causing the signal generator 302 to generate a signal or signal(s) 306 corresponding to the evolving scenario. For example, in one approach a trainee's decision to engage a particular location, or compartment may trigger the measurement (or conversely, prevent triggering the measurement) of a material of interest in the simulation environment. In this exemplary case, the simulation exercise may evolve by causing a signal generator 302 to generate a signal 306 corresponding to a spectral profile of the material of interest and communicate that signal 306 to at least one detector 308 engaged in the simulation exercise.

In some approaches, the simulator system 300 may optionally include a detector 308. However, the simulator system 300 may exclude the detector 308, in which case one or more separate instruments (not shown) may include the detector(s) 308. Regardless of the detector 308 being located in the simulator system 300 or external thereto, the detector 308 is operatively coupled to the signal generator 302 in a manner sufficient to communicate the generated signal(s) 306 to the detector 308 to which the signal generator 302 is coupled. In this manner, the simulator system 300 is configured to generate and/or communicate data representative of one or more events of interest during the course of a simulation exercise.

Preferably, the detector(s) 308 are part of one or more detection instrument(s) configured to detect one or more conditions indicative of an emergency event. For example, in preferred embodiments the sensors include detector components configured to detect conditions indicative of one or more emergency events including radiological, chemical, biological, explosive and/or seismic events. Exemplary detector instruments within the scope of the present disclosure include, but are not limited to, instruments such as spectroscopes, spectrometers, seismometers, digitizers, accelerometers, pressure sensors, radio frequency (RF) sensors, etc. as would be understood by one having ordinary skill in the art upon reading the present descriptions.

Additional exemplary instruments, specifically detectors for use in chemical agent and/or explosive material detection applications include one or more of an ion mobility spectrometer (e.g. a SMITHS DETECTION LCD 3.3, a SMITHS DETECTION SABRE 5000, etc.) a RAMAN spectrometer (e.g. THERMO SCIENTIFIC FIRSTDEFENDER RMX), a Fourier-Transform Infrared (FTIR) spectrometer (e.g. THERMO SCIENTIFIC TRUDEFENDER FT), etc. as would be understood by one having ordinary skill in the art upon reading the present descriptions.

In one approach, the simulator system 300 may additionally and/or alternatively include one or more of the following instruments. In one embodiment, a first approach could preferably be radiation detection as measured by existing or future radiation detectors with capabilities for high spectral resolution to low spectral resolution, or in other cases, radiation dose or count rate.

In some approaches, the system includes one or more instruments designed to detect, localize and characterize aftershocks with M>=−2 (e.g. the signal in the 1-100 Hz frequency band).

Similarly, in one embodiment the system includes instruments such as one or more digitizers configured to store data for a minimum of 2 days (e.g. waveform data, state of health data and metadata). Preferably the digitizer is characterized by having 6 channels, processing at least 500 samples/sec, features gain selection; has a dynamic range of approximately 130 db or better at 100 sps (24 bit A/D); 20 volts peak-peak (full scale at 1× gain; or 0.6 Vpp at gain 32×); and/or a bit weight of at least about 1.5 pV at gain 1× and/or 40 nV at gain 32×.

Other exemplary instruments capable of inclusion in the presently disclosed systems include data processors with reliable trigger algorithms for various types of events (data formats including CSS, SAC, GCF, miniSEED, SEED or PASSCAL).

Still other exemplary instruments include seismometers with features or capabilities such as 3-C, short period, single package; a range of 1 Hz to 40 or 50 Hz; with approximately 2 Hz corner frequency velocity sensor; a minimum sensitivity to ground motion of about 400 V-s-m (at critical damping); a root-mean-square (RMS) noise of about 1 Hz at less than 3 nm/s; and a dynamic range greater than or equal to about 135 dB. Other exemplary seismometers include a L-C (which may be essentially the same as a 3-C seismometer but configured to evaluate vertical motion only. The seismometers are preferably placed in depressions having a minimum depth of no less than about 0.5 m.

Preferably, the error in the distance and azimuth to array arms is no greater than about 1% over a distance of about 100 m, which corresponds to approximately one degree on azimuth.

The exemplary system may also or alternatively include a central data hosting and/or processing system, and any appropriate software therefor. For example, the preferred data hosting and/or processing system is configured to determine seismic source parameters that are dependent on both frequency and waveform characteristics; to determine the type and quality of waveforms; to process data from seismic stations and mini-arrays; to process P and S wave arrival time, to pick waveform group(s); to locate sources of data (e.g. radiation source, chemical leak source, etc.), to process data collected from detector arrays, to generate/evaluate normative values such as L1 and L2 norms; to calculate seismic source parameters (e.g. magnitude, spectra, corner frequency, moment, etc.); to determine average velocities of P and S waves from a cluster of seismic events; to distinguish between seismic and cultural noise (i.e. signal noise originating from non-emergency-event-related sources, such as environmental, human-generated, etc., and to describe seismic event(s) in three-dimensional spaces.

Figure 3B:
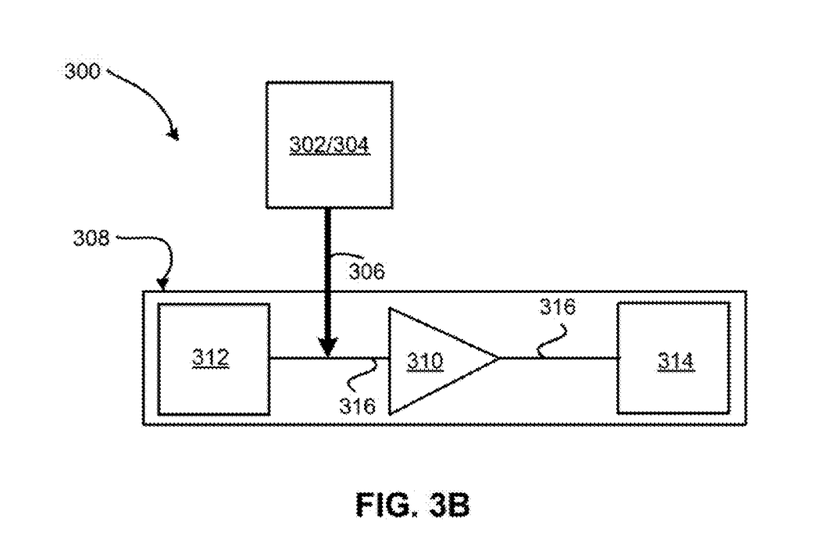
FIG. 3B shows a simplified schematic of a simulator system detector, according to one embodiment.

Returning now to the system as depicted in FIGS. 3A and 3B, in one embodiment, particularly as shown in FIG. 3B, the signal generator 302 is configured to inject the generated signal 306 directly into a receive path 316 of the detector (e.g. immediately upstream of the preamplifier 310, as shown in FIG. 3B and indicated by the downward-facing arrow). In one approach, the signal is injected into the receive path between the sensor 312 of the detector 308 and the preamplifier 310 via a hardwired connection, bus, port, specialty circuit, etc. The injected signal 306 is preferably amplified by the preamplifier 310 before continuing along the receive path 316 to a processor module 314 configured to process and/or interpret the signal 306 in the context of the overall emergency event simulation exercise.

The signal generator 304 is preferably a waveform generator configured to generate one or more waveform signals representing of observable phenomena and/or signal data corresponding to an emergency event.

In some approaches, the signals 306 generated by the waveform generators may represent phenomena or data observable in connection with a radiological event. For example, in some approaches corresponding to a radiological event, the generated signal may include data representative of one or more characteristics including: plume characteristics (e.g. plume size, particle density, radioisotope identity/composition, etc.), weather data (e.g. prevailing wind speed and/or direction); geological characteristics (such as soil composition, altitude, topography, distance, etc.) and/or seismic characteristics (e.g. shockwave magnitude, frequency, etc.) The signal(s) 306 may also be generated in a manner sufficient to represent and account for the presence of radiation shields or shielding events during the simulation, and are particularly configured to simulate any three-dimensional shielding geometry that may be employed in the simulation exercise.

In other approaches, the signal(s) 306 generated by the waveform generators may represent phenomena or data observable in connection with a chemical or explosive event. For example, in some approaches corresponding to a chemical event, the generated signal may include data representative of one or more characteristics used in identifying chemical agent or explosive types, etc., and where training scenarios are represented to include: plume characteristics (e.g. plume size, particle density, radioisotope identity/composition, etc.), weather data (e.g. prevailing wind speed and/or direction); geological characteristics (such as soil composition, altitude, topography, distance, etc.) and/or spectrographic data, (e.g. IR-spectra, mass spectrometer data, or other spectral data corresponding to one or more chemical species, etc.).

In still more approaches, the signals 306 generated by the waveform generators may represent phenomena or data observable in connection with a biological event (e.g., the release of biological material into the environment with subsequent detection by bio-analysis instruments). While current approaches are reliant on detailed sample preparation, rapid advances are being made in the automation of sample preparation and characterization. The presently disclosed systems include manifestation of direct injection of the signals necessary to simulating a biological attack scenario where for example, in some approaches corresponding to a chemical event, the generated signal may include data representative of one or more characteristics used for discrimination (e.g. data corresponding to spectral characteristics exhibited by one or more probes configured to emit spectral data in response to detecting presence of a biological agent of interest) and representing factors such as weather data (e.g. prevailing wind speed and/or direction); geological characteristics (such as soil composition, altitude, topography, distance, etc.).

In some embodiments, the exemplary simulator system 300 may optionally include one or more additional components not essential but advantageous to the operation of the simulator system 300.

For example, in one embodiment the illustrative simulator system 300 includes a removable memory (not shown) such as a flash card or other known memory, such as a solid-state device, magnetic recording medium, etc. The memory is preferably configured to store data comprising one or more of simulation parameters, a simulation event schedule, simulated signal data, probability distribution(s), legacy emergency event data, etc. as would be understood by one having ordinary skill in the art upon reading the present descriptions. Preferably, the removable memory.

In more embodiments, the simulator system 300 preferably includes an integrated locator module (not shown). The locator module may include any type of component configured to determine and/or communicate location information between the various components of the simulator system 300 and the detector 308 thereof (and/or other devices participating in the simulation). However, in preferred approaches the locator module comprises an integrated GPS receiver and/or antenna configured to receive and/or transmit GPS data such as geographic coordinates (latitude and longitude, absolute and/or relative to a point of interest, etc.).

In still more embodiments, the simulator system 300 includes a communication module configured to communicate data to and from the simulator system 300. For example, in one approach the simulator system 300 may include a cellular network card, wireless networking card, radio-frequency identification (RFID) reader and/or transmitter, radio, satellite uplink, etc. as would be understood by one having ordinary skill in the art upon reading the present descriptions.

In still yet more embodiments, the simulator system 300 may include a power supply such as a battery, which may preferably be integrated into a control board of the controller 304.

Those having ordinary skill in the art will appreciate that one of the key advantages conferred by the presently disclosed systems and techniques is the ability to be embodied in modern mobile devices. Accordingly, in some approaches, the simulator system 300 may be embodied in a mobile device such as a tablet computer, mobile phone, laptop, smart watch, personal digital assistant (PDA), etc. as would be understood by one having ordinary skill in the art upon reading the present descriptions.

For example, in one illustrative approach the system includes the detector(s) and a mobile device similar to a smartphone. The mobile device includes controller and signal generator components, and is capable of supporting and hosting the emergency event scenario. The mobile device may retrieve from memory, or alternatively may receive from another mobile device, server, database, memory, etc., the legacy emergency event data. Upon locating/receiving the legacy data, the mobile device may utilize one or more processing resources (e.g. a FPGA, DAC, etc.) to parameterize the legacy emergency event data. Based in whole or in part on the parameterized data, the mobile device generates one or more signals, preferably waveforms. The generated signals correspond to the emergency event(s) for which the legacy data were collected.

While the descriptions above have been offered primarily with reference to a single simulator system 300 (and single detector 308, where separate from the simulator system 300 as shown in FIG. 3A), those having ordinary skill in the art will appreciate that the instant descriptions also include embodiments where the simulation utilizes a plurality of simulator system(s) 300 and/or detector(s) 308 in unison. In such approaches, preferably each simulator system 300 is coupled to or includes at least one detector 308. However, the overall simulation may utilize anywhere from one to several hundred simulator systems 300 and/or coupled detectors 308 to accomplish mass field training of multiple trainees in the most realistic team-response environment possible.

Conducting Simulation Exercises

Having described exemplary embodiments of the presently contemplated simulator system 300, we turn now to several illustrative implementations of the system in a simulation exercise. Those having ordinary skill in the an will appreciate that the present descriptions are offered by way of example, and should not be seen as limiting on the scope of these disclosures. Rather, any equivalent, combination, or modification of the techniques and systems disclosed herein that would be appreciated by a skilled artisan upon reading the instant disclosure is also included in the scope of this application unless expressly indicated otherwise herein.

Figure 4:
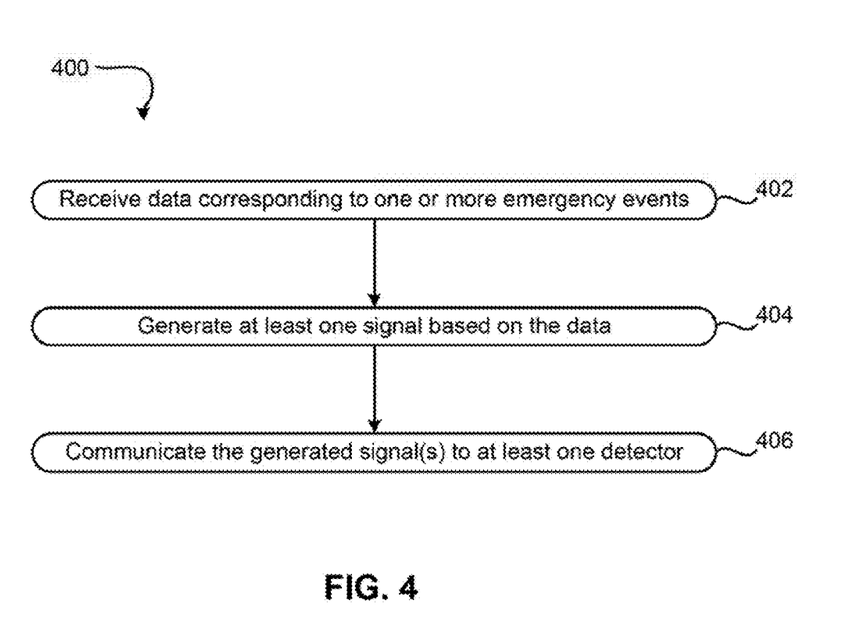
FIG. 4 depicts a flowchart of a method, according to one embodiment.

Simulation may, in one approach, take a form essentially as represented in the flowchart 400 depicted in FIG. 4. The method 400 may be carried out in any suitable environment and utilizing any suitable device(s), techniques, components, etc., such as those depicted in FIGS. 1-3B, and described above.

In one approach, a method 400 includes operation 402 where data are received (e.g. from a server, from a database, from local memory, a detachable memory such as Flash card, etc.), the data corresponding to one or more emergency events being or to be simulated in the course of the simulation exercise.

The method 400 also includes operation 404, where at least one signal is generated based on the received data.

In the simplest embodiment, the method 400 also includes communicating the generated signal(s) to at least one detector in operation 406.

In more approaches, exemplary simulation techniques may include generating at least one of the signals as a waveform signal. Even more preferably, the waveform signal simulates a sensor output of a detector as observed in connection with an actual emergency event, thereby providing realistic representations of actual emergency event data and advantageously obviating the need to utilize dangerous and/or precious materials during the simulation exercise and reducing environmental harm, risk to trainees, and cost of the simulation exercise as a whole.

In still more preferable approaches, the generated waveform signal is characterized by substantial (e.g. 90%, 95%, 99%) consistency with corresponding data observed during an actual emergency event to which the signal corresponds. For example, and with respect to seismic data, in one approach the generated waveform signal may be characterized by having a relevant amplitude and shape corresponding to P and S phases of the waveform.

In one embodiment the signal generating activity occurs in real-time or near real-time during an emergency simulation exercise. The signal generation may, in various approaches, be based at least in part on many factors individually or in combination, such as a predetermined simulation sequence, detecting occurrence of one or more predetermined trigger events, such as measurement conditions, passage of time, location, etc. as would be understood by one having ordinary skill in the art upon reading the present descriptions.

In at least one technique, the signal generating activity occurs at least in part in response to parameterizing legacy data collected to simulate emergency exercises.

In one embodiment, additional data other than the generated signals (or source data from which the signals are generated) may be useful to leverage in connection with a simulation exercise, and which therefore may be leveraged to conduct simulation exercises within the scope of the present disclosures. In one approach, the additional data includes metadata which may be associated with one or more data points corresponding to simulation signals.

Exemplary metadata within the scope of the present disclosures includes information such as location information and/or temporal information. For example, location information includes geographic coordinates (GPS coordinates) in either absolute (e.g. longitude/latitude) or relative (e.g. 10 meters west of reference point X) terms, and temporal information may include relative temporal information such as time elapsed since a reference point like an event origin, a predetermined operation forming part of the simulation sequence, etc. or absolute temporal information, such as a time of day, etc.

In one embodiment, the signals 306 may be generated further based on one the metadata, e.g. based on or more of the location information and the temporal information. For example, in one embodiment a trainee for a given event simulation is in possession of a mobile device configured to collect and/or communicate data during the emergency event simulation. The mobile device includes a location module configured to receive, generate, and/or transmit location information corresponding to a physical location of the mobile device. The location information may be in any form known in the art, such as geographic coordinates (e.g. as obtained from global positioning satellite (GPS) location information). Based on the mobile device location, the emergency event simulation may provide signal output to the mobile device in a manner substantially representing conditions experienced during an actual emergency event.

In another illustrative approach, a device carried by a trainee and in motion during a simulation exercise travels away from an event origin location (e.g. blast epicenter, fault line, facility, etc.). The event includes a plurality of time- and location-dependent stimuli, and a given user's observations of the time- and/or location-dependent stimuli changes depending on the user's location. For example, an event simulating detonation of a nuclear weapon is accompanied by an initial release of radiological materials and seismic activity from the resulting blast. The event also includes a plurality of subsequent seismic events simulating aftershock experienced in connection with nuclear weapon detonation. The time and magnitude of the seismic signal observed by a given user depends at least in part on the location of the user. Accordingly, in the approach where our user/trainee travels away from the event origin location, the observed seismic data are characterized by a reduction in magnitude as a function of distance from the event origin location. Similarly, with increasing distance from event origin location, a particular user will experience the seismic activity (and therefore observe the seismic data) slightly later than a user relatively closer to the event origin location. In this manner, it is possible to provide real-time (or near real-time) updates to the evolution of the simulation exercise.

In some approaches, the presently disclosed techniques may additionally and/or alternatively include parameterizing some or all of the data, and/or generating the signal(s) based on the parameterized data.

Preferably, parameterizing comprises a probabilistic analysis of legacy data, and more preferably parameterizing comprises: determining a probability of one or more emergency events (e.g. aftershock, arrival of radiological/biological/chemical material at a given location, presence of relatively dangerous/safe conditions, etc.) occurring during a simulation based on the (legacy) data; generating a model of event occurrence and/or distribution during the simulation; and generating a schedule of simulation events based at least in part on the model of event occurrence.

Of course, while the present embodiments have been described primarily with reference to legacy data, the inventive concepts disclosed herein also include situations where data used to generate the one or more signals 306 is not legacy data, is not generated prior to conducting the simulation exercise (but rather in real-time during the simulation), and/or is not representative of a specific emergency event described herein (but rather a different or novel emergency event for which legacy data do not exist).

In at least some embodiments, generating and/or communicating the signals occurs based in part or in whole on one or more of a predetermined trigger condition, a predetermined event simulation sequence, and user input. User input may simply be confirmation of a simulation event occurring (e.g. release of a material, arrival of material at a given location, existence of predetermined conditions such as time, measurement conditions, etc.), feedback responsive to an event occurring (e.g. instruction to take action in response to an event occurring, data collected in connection with an event occurring, etc.), or any other type of suitable user feedback as would be appreciated by a skilled artisan reading the present descriptions.

Advantageously, some embodiments of the presently described simulation systems and techniques may include distinguishing the generated signal(s) from noise, and preferably from noise not corresponding to an emergency event, i.e. false-positives. For example, sources of noise not corresponding to an emergency event may include seismic disruptions caused by mining, excavation, fluid injection, or other industrial applications, presence of ionizing radiation due to natural causes such as a magnetic storm on the sun, presence of naturally-occurring bio threat analogs (e.g. sister-species of pathogens, GM organisms), naturally-occurring chemical species with similar spectral profiles as species or moiety of interest and/or known to be present in one or more chemical weapons, etc. as would be understood by one having ordinary skill in the art upon reading the present descriptions.

In some approaches, the generated signals may be communicated as part of a continuous stream of noise, preferably synthetic noise, which may originate from one or more unrelated events such as distant seismic events, mining, explosions, etc.

Moreover still, the generated signals may be communicated based at least in part on detecting existence of one or more predetermined trigger parameters during the simulated emergency event; e.g. event time, magnitude of original event (e.g. earthquake, explosion), soil/rock type, etc. as would be understood by one having ordinary skill in the art upon reading the present descriptions.

In a full-scale embodiment, the presently disclosed techniques may include operations representing an actual emergency response, for example where tens or hundreds of responders are participating in the simulation. These approaches may include generating at least one signal for each detector in an array of the detectors; and communicating the at least one signal to each detector in the detector array. In one approach, each detector array comprises anywhere from about 2 to about 150 or more detectors.

Use Cases

In various embodiments, the presently disclosed inventive concepts may be employed in a variety of practical applications and scenarios. Several exemplary use-cases relating to such practical applications are described below for illustrative purposes only. It should be understood that any of the disclosed use-cases may be employed simultaneously in any combination, according to any suitable approach as would be appreciated by one having ordinary skill in the art upon reading the present descriptions.

Generic Emergency Response

In general, the presently disclosed systems, techniques, products, and various features thereof may be employed to generate and/or conduct high-fidelity simulations of any number of emergency events. Any emergency event having associated therewith one or more observable phenomena, particularly phenomena which may be observed (and preferably quantified) by measuring and/or collecting spectral, environmental (especially weather) and/or seismic data, is fully within the scope of the presently described "emergency events."

In principle, data corresponding to any such emergency event that may be observed in the above manner or any equivalent thereof recognizable by a skilled artisan reading the present descriptions may be catalogued and assembled into an exemplary data set for simulating similar emergency events in subsequent simulated emergency event response exercises such as described herein.

For example, in one approach a compound of interest (which may include a particular chemical, radiological or biological species, is released in an environment, and one or more phenomena are observed in connection with the compound's release. For example, spectral data may be observed and collected over a given duration to track dispersion of the compound of interest throughout the environment into which the compound was released. The spectral data may include absorption and/or emission spectra for one or more radioisotopes, infrared (IR) spectra for one or more chemical compounds or chemical moieties, etc. as would be understood by one having ordinary skill in the art upon reading the present descriptions.

In more examples, the release of the compound of interest may be associated with one or more additional observable phenomena, such as seismic activity in the case of simulating a release of radiological material in connection with detonation of a device containing such radiological material.

Radiological Release Event Response

Radioactive debris dispersed over a large area. Training goal is to develop the capability to identify and localize the resulting nuclear debris that may be deposited. Radiation detection instruments will be deployed. The debris is distributed as multiple individual radiation sources whose flux will vary with time and instrument proximity/location. The time and location dependent sources can be generated for such scenarios and appropriate input to the simulation system developed to allow realistic signals and measurements to be made on the suite of detection instruments that will be deployed in the exercise.

Biological Release Event Response

In one embodiment, simulation may include detection of probes with bio-detectors attached thereto, the probes being configured to emit a recognizable signal (e.g. spectral profile) in response to detecting the biological agent of interest.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system configured to simulate one or more emergency events, the system comprising:
   a signal generator, the signal generator being operatively coupleable to one or more detectors; and
   a controller, the controller being operably coupled to the signal generator and configured to cause the signal generator to:
      generate one or more synthetic signals based at least in part on data comprising either or both of: a trainee identity and a trainee role, each generated synthetic signal being representative of at least one emergency event; and
      communicate one or more of the generated synthetic signal(s) to the one or more detectors to which the signal generator is operably coupled;
   wherein the signal generator includes a waveform generator;
   wherein the waveform generator is configured to generate one or more synthetic waveform signals based at least in part on legacy data of the at least one emergency event; the legacy data being utilized to mimic conditions observed during the at least one emergency event under particular emergency conditions; and
   wherein the waveform generator is operatively coupleable to the one or more detectors so as to inject the one or more synthetic waveform signals directly into a position of a receive path of the one or more of the detectors, the position of the receive path being immediately upstream of a preamplifier of the one or more of the detectors and immediately downstream of a sensor of the one or more of the detectors;
   wherein the controller is further configured to cause the signal generator to generate the one or more synthetic signals in response to receiving an instruction from a user trainee indicating the trainee's decision to engage a particular location within a simulated emergency environment;
   wherein the controller is further configured to cause the signal generator to generate the one or more synthetic waveform signals based at least in part on sampling one or more probability distributions; and
   wherein the one or more probability distributions are based on legacy data collected in connection with one or more prior, actual emergency events.

2. The system as recited in claim 1, further comprising a central data processing system for:
   calculating one or more seismic source parameters corresponding to the one or more synthetic signals;
   determining one or more sources of the one or more synthetic signals;
   determining a type and a quality of one or more waveforms corresponding to the one or more synthetic signals; and
   describing one or more seismic events corresponding to the one or more synthetic signals in a three-dimensional space;
   wherein the one or more detectors comprise one or more seismometers; and
   wherein the one or more seismometers comprise a 1-C seismometer and a 3-C seismometer.

3. The system as recited in claim 1, further comprising:
   an interface configured to couple with a computer readable storage medium;
   one or more multi-channel digitizers;
   a global positioning module;
   a networking component; and
   a power supply.

4. The system as recited in claim 1, further comprising at least 50 of the detectors each having a signal generator associated therewith and operably coupled thereto, wherein the detectors are arranged in at least two detector arrays,
   wherein each detector array is configured to detect conditions indicative of a different type of emergency event, and
   wherein the different types of emergency event comprise seismic events and biological events.

5. The system as recited in claim 1, wherein the one or more generated synthetic signals include data representative of one or more simulation characteristics selected from: a simulated particle density, a simulated soil composition, a simulated altitude, a simulated topography, a simulated shockwave magnitude, a simulated shockwave frequency, a simulated presence of radiation shield(s), and a simulated occurrence of a radiation shielding event.

6. The system as recited in claim 1, wherein the one or more detectors comprise one or more seismometers;
   wherein the one or more seismometers comprise a 1-C seismometer and a 3-C seismometer;

wherein the data further comprises location data and temporal data;

wherein the one or more generated synthetic signals comprise a plurality of synthetic signals each corresponding to a same emergency event; and wherein each of the plurality of synthetic signals is characterized by a magnitude and a timing each determined based at least in part on the location data and temporal data.

7. The system as recited in claim 1, further comprising: an interface configured to couple with a computer readable storage medium;

a global positioning module;

a networking component; and a power supply;

wherein the one or more detectors comprises a plurality of detectors each having a signal generator associated therewith and operably coupled thereto;

wherein the detectors are arranged in at least two detector arrays;

wherein each detector array is configured to detect conditions indicative of a different type of emergency event;

wherein the different types of emergency event comprise seismic events and biological events;

wherein the signal generator includes a waveform generator;

wherein the waveform generator is configured to generate one or more synthetic waveform signals based at least in part on legacy seismic data;

wherein the one or more detectors comprise one or more seismometers;

wherein the one or more seismometers comprise a 1-C seismometer and a 3-C seismometer;

wherein the data further comprises location data and temporal data;

wherein the one or more generated synthetic waveform signals comprise a plurality of synthetic signals each corresponding to a spectral profile of a material of interest during a same emergency event;

wherein the one or more generated synthetic waveform signals include data representative of one or more simulation characteristics selected from: a simulated plume size, a simulated particle density, a simulated prevailing wind speed, a simulated prevailing wind direction, a simulated soil composition, a simulated altitude, a simulated topography, a simulated distance, a simulated shockwave magnitude, a simulated shockwave frequency, a simulated presence of radiation shield(s), and a simulated occurrence of radiation shielding event;

wherein each of the plurality of synthetic signals is characterized by a magnitude and a timing each determined based at least in part on the location data and the temporal data;

wherein the controller is further configured to cause the signal generator to generate the one or more synthetic signals:

in response to receiving an instruction from a user indicating the user's decision to engage a particular location within a simulated emergency environment; and based at least in part on sampling one or more probability distributions; and wherein at least one of the following provisos is/are satisfied:

the location data corresponds to a location selected from:

a location indicated to the system by a user for engagement; and a location of a first responder within a simulation environment;

the temporal data is selected from:

an amount of time elapsed since exposure of the simulation environment to a material of interest;

an amount of time elapsed since a particular emergency event; and an amount of time remaining in a simulation of the one or more emergency events; and the trainee role is selected from:

responder;

inspector; and commander.

8. A method for simulating one or more emergency events, comprising:

receiving, by a controller, data corresponding to one or more emergency events, the data comprising at least one of a trainee identity, and a trainee role;

generating, by a signal generator operatively coupled to the controller, at least one synthetic signal based at least in part on the data; and communicating, by the controller, the at least one of the generated synthetic signal(s) to at least one detector; the at least one of the generated synthetic signal(s) being representative of at least one emergency event; and wherein the signal generator includes a waveform generator;

wherein the waveform generator is configured to generate the at least one synthetic signal based at least in part on legacy data of the at least one emergency event, the legacy data being utilized to mimic conditions observed during the at least one emergency event under particular emergency conditions; and wherein communicating the at least one of the generated synthetic signal(s) to the at least one detector comprises injecting the at least one of the generated synthetic signal(s) directly into a position of a receive path of the at least one detector, the position of the receive path being immediately upstream of a preamplifier of the at least one detector and immediately downstream of a sensor of the one or more of the detectors;

wherein the controller is further configured to cause the signal generator to generate the at least one synthetic signal in response to receiving an instruction from a user trainee indicating the trainee's decision to engage a particular location within a simulated emergency environment;

wherein the controller is further configured to cause the signal generator to generate the at least one synthetic signal based at least in part on sampling one or more probability distributions; and wherein the one or more probability distributions are based on legacy data collected in connection with one or more prior, actual emergency events.

9. The method as recited in claim 8, wherein the at least one generated synthetic signal comprises spectral data corresponding to presence of a biological agent of interest, and wherein the spectral data are selected from infrared spectra, mass spectrometer data, and spectral data emitted by a probe configured to detect the presence of the biological agent of interest.

10. The method as recited in claim 8, wherein the generating occurs in real-time during an emergency simulation exercise based at least in part on: a predetermined simulation sequence and detecting one or more predetermined trigger events during the emergency simulation exercise.

11. The method as recited in claim 8, wherein the data further comprises location information and temporal information,
    wherein the generating is further based on the location information and the temporal information; and
    wherein the location information and the temporal information correspond to a responder participating in an emergency simulation exercise, during the emergency simulation exercise.

12. The method as recited in claim 8, further comprising parameterizing some or all of the data, wherein the signal is generated based on the parameterized data, wherein the parameterizing comprises a probabilistic analysis of legacy data corresponding to one or more prior, actual emergency events of a same type simulated by the one or more synthetic signals.

13. The method as recited in claim 8, comprising characterizing one or more aftershock events based on legacy data corresponding to one or more prior, actual emergency events of a same type simulated by the one or more synthetic signals.

14. The method as recited in claim 8, wherein the communicating is based at least in part on detecting existence of one or more predetermined trigger parameters of the one or more emergency events.

15. The method as recited in claim 8, wherein each of the generating and the communicating are based on a predetermined trigger condition, a predetermined event simulation sequence, and user input.

16. The method as recited in claim 8, further comprising distinguishing the synthetic signal(s) from synthetic noise not corresponding to the emergency events.

17. The method as recited in claim 8, wherein the synthetic signals are communicated as part of a continuous stream comprising synthetic noise representative of one or more unrelated events selected from a group consisting of seismic disruptions; magnetic storms; and naturally occurring bio-threat analogs.

18. The method as recited in claim 8, further comprising: generating at least one of the synthetic signals for each detector in an array of the detectors; and
    communicating the at least one generated synthetic signal to each detector in the detector array;
    parameterizing some or all of the data, wherein the at least one generated synthetic signal is generated based on the parameterized data, wherein the parameterizing comprises: determining a probability of one or more emergency events occurring during a simulation based on the data;
    generating a model of event occurrence during the simulation; and generating a schedule of simulation events based at least in part on the model of event occurrence;
    distinguishing the at least one generated synthetic signal from synthetic noise not corresponding to the emergency events;
    wherein the communicating is based at least in part on detecting existence of one or more predetermined trigger parameters of the one or more emergency events;
    wherein each of the generating and the communicating are based on a predetermined trigger condition, a predetermined event simulation sequence, and user input;
    wherein the at least one generated synthetic signal is communicated as part of a continuous stream comprising synthetic noise representative of one or more unrelated events selected from a group consisting of seismic disruptions; magnetic storms; and naturally occurring bio-threat analogs;
    wherein the data further comprises location information and temporal information, wherein the generating is further based on the location information and the temporal information;
    wherein the location information and the temporal information correspond to a responder participating in an emergency simulation exercise, during the emergency simulation exercise;
    wherein the at least one generated synthetic signal is a synthetic waveform signal simulating a sensor output of the at least one detector;
    wherein the synthetic waveform signal is generated based on sampling a probability distribution representing at least one prior, actual emergency event;
    wherein the waveform signal is characterized by substantial consistency with the emergency event to which the signal corresponds wherein the at least one generated synthetic signal comprises spectral data corresponding to presence of a biological agent of interest;
    wherein the spectral data are selected from infrared spectra, mass spectrometer data, and spectral data emitted by a probe configured to detect the presence of the biological agent of interest;
    wherein the generating occurs in real-time during an emergency simulation exercise based at least in part on: a predetermined simulation sequence; and
    detecting one or more predetermined trigger events during the emergency simulation exercise.

19. A method for simulating one or more emergency events, comprising:
    receiving, by a controller, data corresponding to one or more emergency events; the data comprising at least one of a trainee identity, and a trainee role;
    generating, by a signal generator operatively coupled to the controller, at least one synthetic signal based on the data; the at least one of the generated synthetic signal(s) being representative of at least one emergency event;
    communicating, by the controller, the at least one generated synthetic signal to a detector;
    parameterizing some or all of the data, wherein the at least one generated synthetic signal is generated based on the parameterized data;
    wherein the parameterizing comprises:
        determining a probability of one or more emergency events occurring during a simulation based on the data;
        generating a model of event occurrence during the simulation; and
        generating a schedule of simulation events based at least in part on the model of event occurrence;
    wherein the signal generator includes a waveform generator;
    wherein the waveform generator is configured to generate the at least one synthetic signal based at least in part on legacy data of the at least one emergency event; the legacy data being utilized to mimic conditions observed during the at least one emergency event under particular emergency conditions; and
    wherein communicating the at least one generated synthetic signal to the detector comprises injecting the at least one generated synthetic signal directly into a position of a receive path of the detector, the position of the receive path being immediately upstream of a preamplifier of the detector and immediately downstream of a sensor of the detector;

wherein the controller is further configured to cause the signal generator to generate the at least one synthetic signal in response to receiving an instruction from a user trainee indicating the trainee's decision to engage a particular location within a simulated emergency environment;

wherein the controller is further configured to cause the signal generator to generate the at least one synthetic signal based at least in part on sampling one or more probability distributions; and wherein the one or more probability distributions are based on legacy data collected in connection with one or more prior, actual emergency events.

* * * * *

UNITED STATES PATENT AND TRADEMARK OFFICE
CERTIFICATE OF CORRECTION

PATENT NO. : 9,836,993 B2
APPLICATION NO. : 14/109846
DATED : December 5, 2017
INVENTOR(S) : Dunlop et al.

Page 1 of 1

It is certified that error appears in the above-identified patent and that said Letters Patent is hereby corrected as shown below:

On the Title Page

Item (72) Inventor is corrected to read:
-- William H. Dunlop, Livermore (CA);
Tawny R. Koncher, Brentwood (CA);
Stanley John Luke, Dublin (CA);
Jerry Joseph Sweeney, Livermore (CA);
Gregory K. White, Livermore (CA);
Steven Andrew Kreek, Livermore (CA) --.

Signed and Sealed this
Twenty-third Day of June, 2020

Andrei Iancu
*Director of the United States Patent and Trademark Office*